3,398,478
SNARES
Ralph E. Pearsall, Gloucester, Mass., assignor to United Shoe Machinery Corporation, Flemington, N.J., a corporation of New Jersey
Filed June 17, 1966, Ser. No. 558,473
6 Claims. (Cl. 43—58)

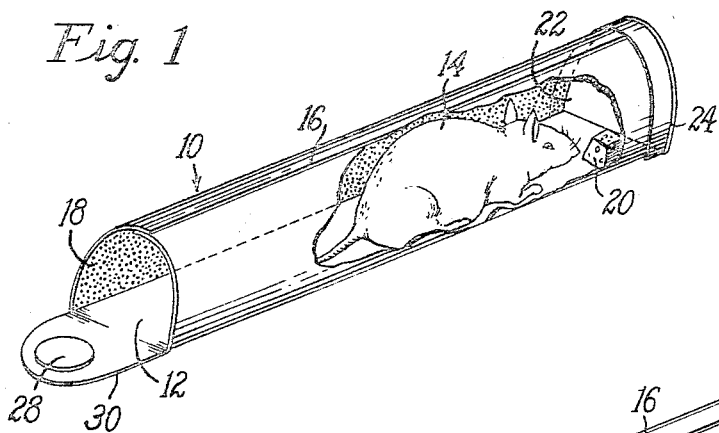
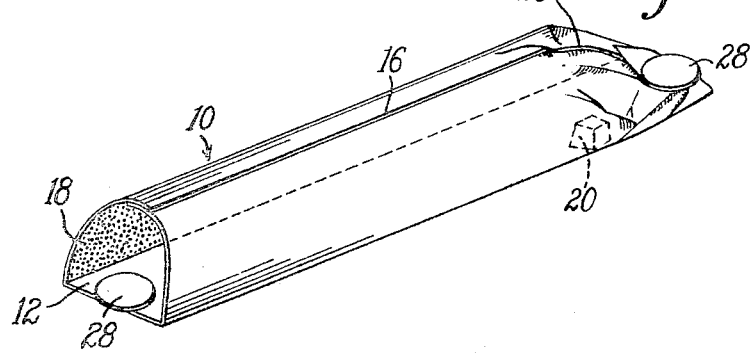
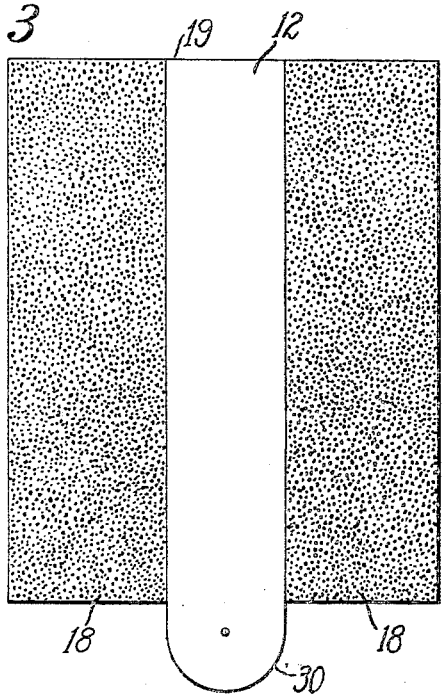
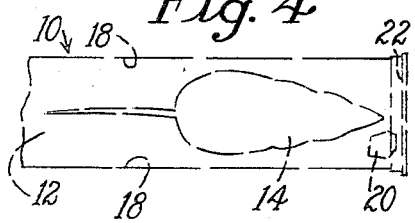
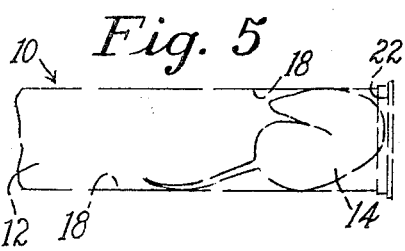
Inventor
Ralph E. Pearsall
By his Attorney
Benjamin C. Pollard

United States Patent Office 3,398,478
Patented Aug. 27, 1968

This invention relates to a snare for small animals such as rats and mice.

Other than spring jaw traps, devices for catching rats and mice have involved a closed chamber having a one-way entrance which may be a trap door or a passageway through which the animal can push its way in, but cannot force its way out. A further device comprises a chamber with a floor formed of tacky adhesive coated paper. Entrances to the chamber have had to be elevated well above the floor since otherwise the rodent would draw back after touching the adhesive. Such devices suffer from the disadvantage that the difficulty of entering reduces the chance that a rat or mouse may enter the trap. Also disposing of the trapped animal is an unpleasant operation.

It is an object of the present invention to provide a snare having no moving parts to set and presenting no obstructions to the entrance to the holding area so that animals are not deterred from entering.

To these ends and in accordance with a feature of the present invention there is provided a snare providing a free unimpeded path for an animal to be caught to a location in which movement of the animal to leave brings it into holding engagement with a tacky adhesive surface.

It is a further object to provide an inexpensive disposable snare which is effective to catch and hold a rodent out of sight so that the snare and rodent may be disposed of without unpleasantness.

To these ends and in accordance with a further feature of the present invention, there is provided a snare in the form of a disposable tube closed at one end and constructed to catch an animal out of sight near the closed end.

The snare of the present invention is a tacky adhesive surface device operating on a new principle in which a clear path for the animal to be caught leads between tacky adhesive surfaces to an area in which the animal is effectively surrounded by tacky adhesive and is caught and held by the surfaces when it turns to leave.

The invention will be described in relation to the accompanying drawings forming part of the disclosure in which:

FIG. 1 is an angular view of one form of snare in accordance with the present invention with parts broken away to show the relation in dimensions of the snare and of an animal to be caught;

FIG. 2 is an angular view of another form of the snare of the present invention;

FIG. 3 shows a blank for making a snare with a cement-free area for forming a pathway and tacky adhesive coated areas to be folded around to enclose the pathway;

FIG. 4 is a diagrammatic plan view showing an animal approaching the bait in a snare; and FIG. 5 is a diagrammatic plan view showing an animal caught against the walls of the snare in the course of turning after consuming the bait.

In the forms of the invention shown in FIGS. 1 and 2, a tubular member 10, preferably flattened on its bottom provides an enclosed pathway 12. The tube 10 may be cylindrical, rectangular or other cross-section and may be formed of any suitable material such as cardboard, paper or plastic. The dimensions of the tube 10 depend upon the size of the animal to be caught and will have a width materially less than the length of the animal 14 but at least slightly greater than its width in order to allow for ready access and free movement of the animal along the pathway 12. By way of example, for catching a mouse, the tube may be from 4 to 6 inches long and approximately 1½ inches in diameter.

The tube 10 may have any convenient structure. For example, in the preferred forms shown in FIGS. 1 and 2, sheet material such as stiff paper or cardboard may be bent into tubular shape and held by a longitudinal seam 16. Alternatively in a form of the snare, not shown, the tube 10 may be formed of a strip of paper or cardboard wound in helical form as in cores for paper rolls. The tube 10 formed with a longitudinal seam 16 offers the advantage that, in making it, the tacky adhesive may be applied as adhesive bands 18 to a strip of paper 19 as shown in FIG. 3 with a space free from adhesive to serve as pathway 12 between the bands 18 of adhesive. If desired, the bands 18 of adhesive may be applied to a continuous strip of paper which may then be cut into sections of suitable length and bent and seamed to form tubes 10. The area on the interior of a tube 10 which is free from adhesive is disposed lowermost in the snare as used to serve as a pathway 12 to allow entry of the rodent 14 into the tube 10. Tubes 10 which are formed before application of the adhesive may have adhesive applied to the interior by an convenient method leaving a strip to serve as pathway 12 free from adhesive on the side to be lowermost in the snare as used.

Bait 20 attractive to the animal to be caught is secured within the tube adjacent one end 22 of the tube and that end is then closed. Closure of the tube may be effected by means of a cap 24 fitting over the end 22 of the tube 10 as shown in FIG. 1. Alternatively, the end of the tube may be closed by folds 26 of the tube 10 as shown in FIG. 2. The tube 10 may be secured with the adhesive-free pathway 12 lowermost and held against displacement or rolling by any suitable means. In the form of the device shown in FIG. 1 in which a cap 24 is supplied, a tack 28 or other fastening device may be pressed through lower portions of the tube 10 and extend into a supporting surface to anchor the snare in place. For convenience an extension of the bottom portion of the tube forming a tab 30 to receive a tack 28 may be provided at the open end of the tube 10 as shown in FIG. 1. This tab may be foldable to allow placing a closure such as a cap similar to the cap 24 over the open end of the tube 10 to seal the tube prior to disposal when an animal has been caught in the tube. Where the end of the tube 10 is closed by folding as in FIG. 2, a tack 28 may be forced through the flattened end portion into a supporting surface.

As illustrated diagrammatically in FIG. 4, the snare provides a pathway 12 leading to the attracting bait. The pathway is free of adhesive but is disposed between tacky adhesive surfaces 18 which are spaced apart a distance greater than the width of the animal 14 but less than its length. There is no obstacle in the pathway so that the animal 14 to be caught can move freely to the bait 20 adjacent the closed end 22 of the pathway. The inner end of the pathway 12 is closed at 22 so that, as illustrated in FIG. 5, the animal having taken the bait can only leave by turning around to go back along pathway 12. Because the animal's length is considerably greater than its width and the space between the surfaces 18 is too small to accommodate the length of the animal 14, the act of turning brings portions of the animal's fur into holding engagement with the adhesive on the sides. Force exerted by the animal to escape strengthens the hold of the adhesive. The animal is caught out of sight adjacent the closed end of the tube; and the whole package of snare and animal may be disposed of in any suitable manner.

Having thus described my invention, what I claim as new and desire to secure by Letters Patent of the United States is:

1. A snare for small animals comprising means providing a pathway onto which an animal may be attracted by bait, tacky adhesive surfaces on each side of the pathway leaving the pathway free from adhesive, said tacky adhesive surfaces being spaced a distance greater than the width of the animal to be snared but less than the length of said animal, and a barrier at one end of said pathway.

2. A snare as defined in claim 1 in which said pathway extends within a tube from an open end thereof to said barrier, and in which the tacky adhesive surfaces are carried by the inner walls of said tube.

3. A snare as defined in claim 2 in which said tube is generally cylindrical with one side flattened and free from adhesive to provide said pathway and fastener means are provided to hold said flattened portion down to prevent rolling of said snare.

4. A snare as defined in claim 3 in which a tab for engagement by said fastener means is provided at the open end of said passageway and is foldable to allow placing a cap over said opened end.

5. A snare as defined in claim 2 in which said barrier is a cap secured at the end of said tube opposite said open end.

6. A snare as defined in claim 2 in which folded portions of said tube at the end opposite said open end constitute said barrier.

References Cited

UNITED STATES PATENTS

| | | | |
|---|---|---|---|
| 897,919 | 9/1908 | Muller | 43—114 X |
| 912,134 | 2/1909 | King | 43—65 |
| 1,112,064 | 9/1914 | Gordon | 43—114 |
| 1,132,428 | 3/1915 | Boswell | 43—60 |
| 1,283,018 | 10/1918 | Albrecht et al. | 43—65 |
| 2,962,836 | 12/1960 | Hughes | 43—58 |

WARNER H. CAMP, *Primary Examiner.*